US012639797B2

(12) United States Patent (10) Patent No.: US 12,639,797 B2
Yun et al. (45) Date of Patent: May 26, 2026

(54) IMAGE INPAINTING METHOD AND DEVICE

(71) Applicant: SK TELECOM CO., LTD., Seoul (KR)

(72) Inventors: Jong Kil Yun, Seoul (KR); Dong Won Kim, Seoul (KR); Jeong Yeon Lim, Seoul (KR); Jae Ho Hur, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 298 days.

(21) Appl. No.: 18/132,015

(22) Filed: Apr. 7, 2023

(65) Prior Publication Data

US 2023/0245283 A1 Aug. 3, 2023

Related U.S. Application Data

(63) Continuation of application No. PCT/KR2021/013795, filed on Oct. 7, 2021.

(30) Foreign Application Priority Data

Oct. 8, 2020 (KR) ........................ 10-2020-0129912
Oct. 8, 2020 (KR) ........................ 10-2021-0083112

(51) Int. Cl.
*G06T 5/77* (2024.01)
*G06T 5/50* (2006.01)
(Continued)

(52) U.S. Cl.
CPC .................. *G06T 5/77* (2024.01); *G06T 5/50* (2013.01); *G06T 7/248* (2017.01); *G06V 10/761* (2022.01)

(58) Field of Classification Search
CPC .. G06T 5/77; G06T 5/50; G06T 7/248; G06T 7/11; G06T 7/90; G06T 5/00; G06V 10/761; G06V 10/454; G06V 10/82; G06V 20/62
See application file for complete search history.

(56) References Cited

U.S. PATENT DOCUMENTS

2009/0074328 A1 3/2009 Matsumoto et al.
2010/0329336 A1 12/2010 Sohn et al.
(Continued)

FOREIGN PATENT DOCUMENTS

CN 101388977 A 3/2009
CN 109816611 A 5/2019
(Continued)

OTHER PUBLICATIONS

A robust forgery detection, Zhang et al 2017 (Year: 2017).*
(Continued)

*Primary Examiner* — Jianxun Yang
(74) *Attorney, Agent, or Firm* — Hauptman Ham, LLP

(57) ABSTRACT

The present disclosure provides an image inpainting method and an image inpainting device. The present disclosure in at least one embodiment provides a method of inpainting an image area obscured by an object included in an image, including selecting one or more frames among input frames of the image, wherein each of the one or more frames is selected as a target frame including an inpainting area obscured by the object or as a reference frame including information on the inpainting area, and performing at least one of inter inpainting or intra inpainting depending on a number of frames selected as the reference frame.

19 Claims, 16 Drawing Sheets

(51) Int. Cl.
G06T 7/246 (2017.01)
G06V 10/74 (2022.01)

(56) References Cited

U.S. PATENT DOCUMENTS

| | | | |
|---|---|---|---|
| 2013/0162787 A1 | 6/2013 | Cho et al. | |
| 2016/0171669 A1 | 6/2016 | Abdollahian et al. | |
| 2017/0091588 A1 | 3/2017 | Liu | |
| 2017/0289513 A1 | 10/2017 | Sharma et al. | |
| 2021/0035268 A1 | 2/2021 | Xu et al. | |
| 2021/0217145 A1* | 7/2021 | El-Khamy | ............... G06T 7/20 |
| 2021/0327031 A1 | 10/2021 | Xie et al. | |

FOREIGN PATENT DOCUMENTS

| | | |
|---|---|---|
| CN | 110288549 A | 9/2019 |
| CN | 111105382 A | 5/2020 |
| CN | 111539879 A | 8/2020 |
| CN | 111614996 A | 9/2020 |
| GB | 2578354 A | 5/2020 |
| KR | 10-2009-0090151 A | 8/2009 |
| KR | 10-2013-0073459 A | 7/2013 |

OTHER PUBLICATIONS

Onion-Peel Networks, Oh et al 2019 (Year: 2019).*

International Search Report issued on Jan. 25, 2022, for corresponding International Patent Application No. PCT/KR2021/013795, along with an English translation (5 pages).

Written Opinion issued on Jan. 25, 2022, for corresponding International Patent Application No. PCT/KR2021/013795 (4 pages).

Dengyong Zhang et al., "A robust forgery detection algorithm for object removal by exemplar-based image inpainting", Multimedia Tools and Applications, May 22, 2017, vol. 77, pp. 11823-11842.

Office Action dated Oct. 24, 2024 for corresponding Korean Patent Application No. 10-2020-0129912, along with an English translation (12 pages).

Notice of Allowance dated Mar. 5, 2025 for corresponding Korean Patent Application No. 10-2021-0083112, along with an English translation (3 pages).

Office Action issued on Nov. 24, 2025, for corresponding Chinese Patent Application No. 202180081022.3, along with an English machine translation (16 pages).

* cited by examiner

430

430a

430b

440

440a

440b

440c

_144_

_1100_

IMAGE INPAINTING METHOD AND DEVICE

CROSS-REFERENCE TO RELATED APPLICATION

The present application is a continuation of International Application No. PCT/KR2021/013795, filed Oct. 7, 2021, which is based upon and claims priority to Korean Patent Application No. 10-2020-0129912 filed on Oct. 8, 2020, and Korean Patent Application No. 10-2021-0083112 filed on Oct. 8, 2020. The entire disclosure of the above application is incorporated herein by reference.

TECHNICAL FIELD

The present disclosure in some embodiments relates to an image inpainting method and an image inpainting device.

BACKGROUND

The statements in this section merely provide background information related to the present disclosure and do not necessarily constitute prior art.

Various subtitles are added to videos to help viewers understand them or to make more interesting videos. For example, when imported for domestic audiences, a foreign video has the performers' voices, etc. translated and added as subtitles. In addition, subtitles help to convey the content even in noisy environments.

However, in some cases, subtitles turn into a hindrance to viewing the video. For example, a viewer watching a video to learn a foreign language may find that the subtitles interfere with their learning. Additionally, excessive subtitles can obscure portions of the screen, making it difficult to focus on the video. Furthermore, if a foreign language subtitle is added and the viewer does not understand it, having no subtitle may be better.

When subtitles and video exist as separate channels, editing or removing the subtitles is not difficult. However, difficulty arises when the subtitles are integrated with the video and the original video before the subtitles were added is not available. In this case, the video is often altered to hide the subtitles, such as by blurring the subtitled area, adding a translucent and/or opaque band over the subtitled area, or in some serious cases, cutting out the entire subtitled area from the video.

Accordingly, there is a growing need for techniques to inpaint areas obscured by subtitles without destroying the video.

Existing image inpainting techniques include diffusion-based methods which inpaint the obscured area by referring to the neighboring pixel information of the area to be removed, and patch-based methods which divide the screen into multiple regions and then select a suitable region to replace the obscured area.

SUMMARY

The present disclosure in some embodiments seeks to provide an image inpainting method and an image inpainting device that generate an inpainted image having high quality by selecting from an input image a target frame to remove subtitles from and a reference frame to obtain information about an area obscured by subtitles, and thereby performing inter-frame correlation-based image inpainting and/or intra-frame correlation-based image inpainting.

At least one aspect of the present disclosure provides a method of inpainting an image area obscured by an object included in an image, including selecting one or more frames among input frames of the image, wherein each of the one or more frames is selected as a target frame including an inpainting area obscured by the object or as a reference frame including information on the inpainting area, and performing at least one of inter inpainting or intra inpainting depending on a number of frames selected as the reference frame.

Another aspect of the present disclosure provides a device for inpainting an image area obscured by an object included in an image, including a frame selection unit and an inpainting unit. The frame selection unit is configured to select one or more frames among input frames of the image, wherein each of the one or more frames is selected as a target frame including an inpainting area obscured by the object or as a reference frame including information on the inpainting area. The inpainting unit is configured to perform at least one of inter inpainting or intra inpainting according to a number of frames selected as the reference frame to generate an inpainted frame.

As described above, the present disclosure according to at least one embodiment can generate a high-quality inpainted image by selecting from an input image a target frame to remove subtitles from and a reference frame to obtain information on an area obscured by subtitles, and thereby performing inter-frame correlation-based image inpainting and/or intra-frame correlation-based image inpainting.

Furthermore, the present disclosure according to embodiments can obtain, from the completed image with subtitle editing, the original image before the editing, thereby effecting cost reductions in purchasing the original image, storing the original image, and performing the image processing.

REFERENCE NUMERALS

Figure 1:
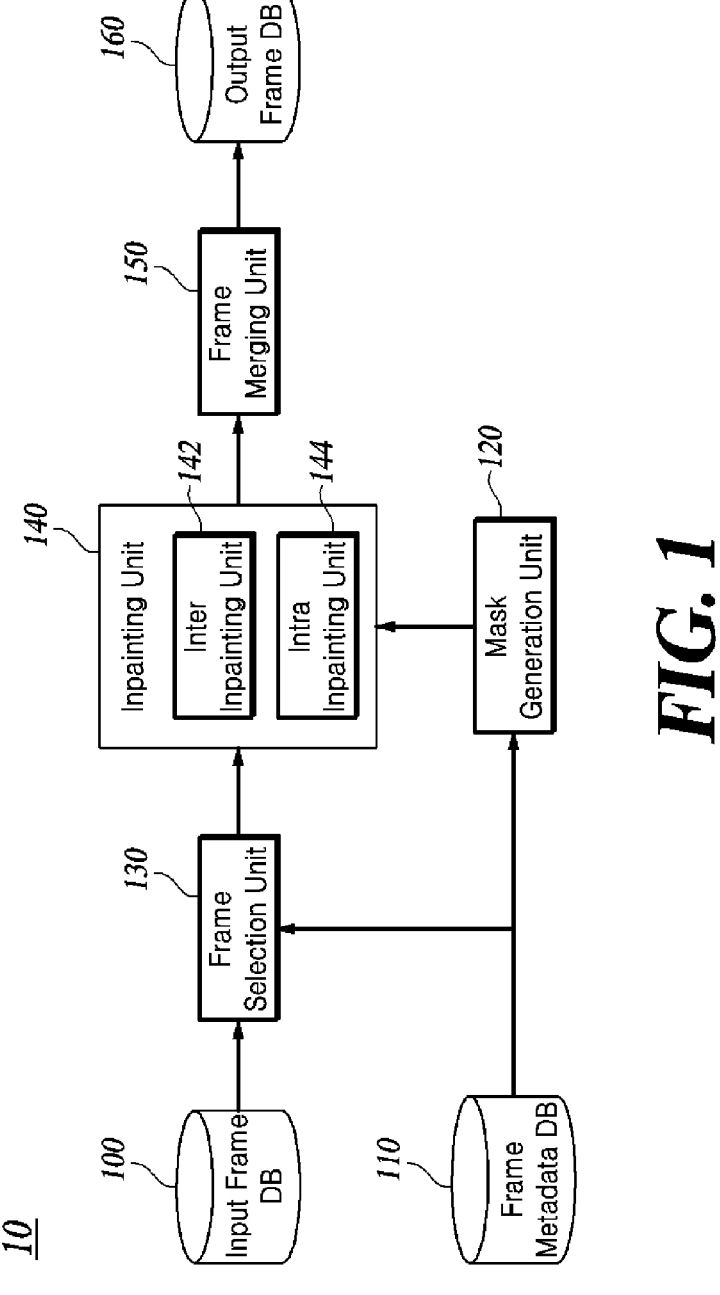
FIG. 1 is a schematic block diagram of an image inpainting device according to at least one embodiment of the present disclosure.

| | |
|---|---|
| 10: image inpainting device | 100: input frame DB |
| 110: frame metadata DB | 120: mask generation unit |
| 130: frame selection unit | 140: inpainting unit |
| 142: inter inpainting unit | 144: intra inpainting unit |
| 150: frame merging unit | 160: output frame DB |

DETAILED DESCRIPTION

Hereinafter, some embodiments of the present disclosure will be described in detail with reference to the accompa-nying illustrative drawings. In the following description, like reference numerals designate like elements, although the elements are shown in different drawings. Further, in the following description of some embodiments, a detailed description of related known components and functions when considered to obscure the subject of the present disclosure will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specifica-tion, when a part "includes" or "comprises" a component, the part is meant to further include other components, not to exclude thereof unless specifically stated to the contrary. The terms such as "unit," "module," and the like refer to one or more units for processing at least one function or operation, which may be implemented by hardware, software, or a combination thereof.

The following description presents various embodiments of the present disclosure by using a subtitle as an example target object to be removed by an image inpainting device. However, this is for illustrative purposes only and does not limit the present disclosure to such embodiments. For example, an image inpainting device according to at least one embodiment of the present disclosure may inpaint an image area that is obscured by an object such as a particular trademark and/or logo.

FIG. 1 is a schematic block diagram of an image inpaint-ing device according to at least one embodiment of the present disclosure.

As shown in FIG. 1, the image inpainting device 10 according to at least one embodiment includes all or some of an input frame database (DB) 100, a frame metadata DB 110, a mask generation unit 120, a frame selection unit 130, an inpainting unit 140, a frame merging unit 150, and an output frame DB 160. Not all of the blocks illustrated in FIG. 1 are requisite components, and some of the blocks included in the image inpainting device 10 may be added, changed, or deleted in other embodiments. For example, the image inpainting device may not include the frame merging unit 150 if only one out of inter-inpainting and intra-inpainting is selected and performed on the target frame. Each component of the image inpainting device 10 may be implemented in hardware or software, or a combination of hardware and software. Additionally, each component may have its functionality implemented in software and one or more processors may be implemented to execute the soft-ware functionality corresponding to each component.

The input frame DB 100 generates, from the input image containing the object (e.g., the subtitle) to be removed, frame-by-frame, and stores the frames.

The frame metadata DB 110 extracts, from the input image, scene transition information, subtitle location infor-mation, text information used in the subtitle, and/or font information used in the subtitle and stores the extracted information.

The mask generation unit 120 generates a mask image representing the subtitle area based on the text and font used in the subtitle.

The frame selection unit 130 selects, from among the input frames, based on the frame metadata and/or the mask image, a target frame that includes the object to remove and a reference frame that includes information about the inpainting area within the target frame obscured by the object. In some embodiments, the frame selection unit 130 may use neighboring pixels of the area in which the object is detected within the target frame to calculate a similarity between the target frame and frames adjacent to the target frame for selecting a frame having a similarity higher than a predetermined threshold similarity as the reference frame and generating information about a similar area having the highest similarity within the reference frame.

A specific description of the frame selection unit 130 will be described with reference to FIGS. 2 through 6B.

The inpainting unit 140 removes the subtitle from the target frame based on the target frame, the reference frame, and the mask image, and inpaints the area that was obscured by the subtitle. In this disclosure, "inpainting" is used to mean reconstructing pixels in the area obscured by the subtitle 202 by referencing pixels in other frames and/or pixels at other locations in other input frames. The inpaint-ing unit includes an inter inpainting unit 142 and an intra inpainting unit 144. The inter inpainting unit 142 performs inpainting of the target frame based on inter-frame correla-tion, while the intra inpainting unit 144 performs inpainting of the target frame based on intra-frame correlation. Here-inafter, inter-frame correlation-based inpainting is referred to as inter inpainting, and intra-frame correlation-based inpainting is referred to as intra inpainting.

The inpainting unit 140 according to at least one embodi-ment of the present disclosure performs at least one of inter inpainting or intra inpainting based on information about the target frame and the reference frame selected by the frame selection unit 130. According to embodiments, the inpaint-ing unit 140 may perform at least one of inter inpainting or intra inpainting to inpaint the target frame based on the number of frames selected as reference frames. According to embodiments, the inpainting unit 140 may inpaint the target frame by receiving information about the target frame, the reference frame, and similar areas from the frame selection unit 130.

A more detailed description of the inter inpainting unit 142 and the intra inpainting unit 144 will be presented with reference to FIGS. 7 to 13.

The frame merging unit 150 synthesizes the output of the inter inpainting unit 142 and the output of the intra inpaint-ing unit 144, or selects one of the outputs of the inter inpainting unit 142 and the output of the intra inpainting unit 144 to use as an inpainted frame. The frame merging unit 150 will be described in more detail with reference to FIG. 14.

The output frame DB 160 stores the frames of the output image from which the subtitles are removed.

A frame selection unit according to a first embodiment of the present disclosure is described in the following with reference to FIGS. 2 to 4C.

FIGS. 2 through 4C illustrate a frame selection unit according to the first embodiment of the present disclosure.

Figure 2:
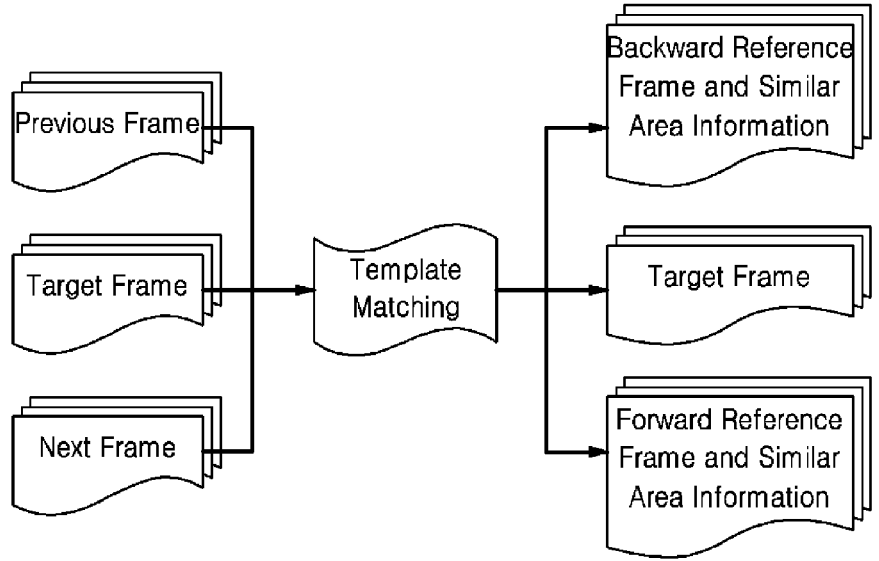
FIGS. 2 through 4C illustrate a frame selection unit according to a first embodiment of the present disclosure.

As shown in FIG. 2, the frame selection unit 130 according to at least one embodiment of the present disclosure selects a forward reference frame and a backward reference frame having high similarity to the target frame from a previous frame located temporally before the target frame and/or a next frame located temporally after the target frame and extracts similar area information for the reference frames. Here, a forward reference frame means a frame among the next frames that has high similarity to the target frame, and a backward reference frame means a frame among the previous frames that has high similarity to the target frame.

The frame selection unit 130 provides the target frame, the reference frame, and the similar area information for the reference frames as input to a deep neural network provided in the inpainting unit 140.

Hereinafter, before describing how the frame selection unit 130 according to at least one embodiment of the present disclosure extracts similar area information, terms used in the present disclosure will be explained with reference to FIG. 3A and FIG. 3B.

Figure 3A:
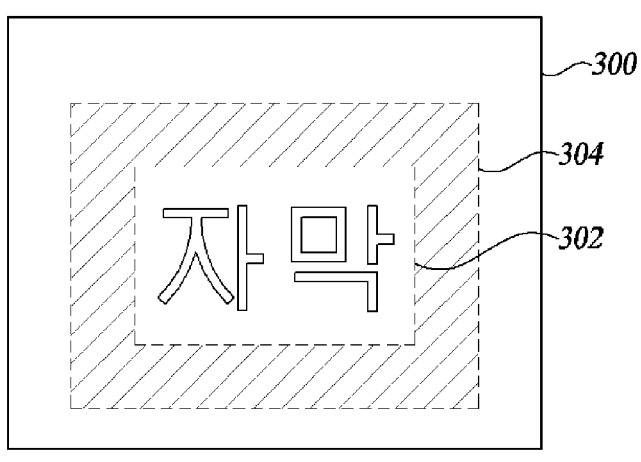

As shown in FIG. 3A, a detected area 302 represents an area within a frame or a specific area 300 of the frame in which "자막" (subtitle) is detected. According to at least one embodiment of the present disclosure, the frame selection unit 130 may detect subtitles using optical character recognition (OCR) but is not limited to such an example. A neighbor area 304 represents an area that is a certain distance away from the detected area 302 and/or a rectangular area that includes the detected area 302.

Figure 3B:
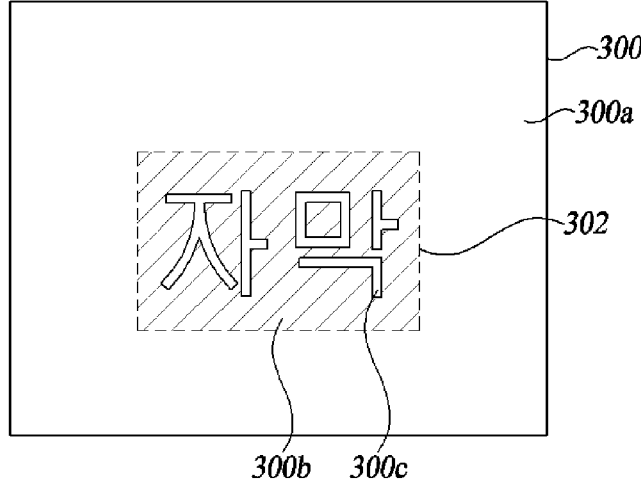

As shown in FIG. 3B, a frame or a specific area 300 of the frame may be divided based on the detected area 302 and the subtitle into an outer area 300a, an inner area 300b, and a subtitle area 300c. The outer area 300a refers to an area in which subtitles are not detected, i.e., an outer area of the detected area 302. The inner area 300b refers to an area within the detected area 302 that does not correspond to subtitles. The subtitle area 300c refers to an area corresponding to subtitles within the detected area 302, which is an area in which to perform subtitle removal and inpainting.

Based on the above terms, reference will now be made to FIGS. 4A through 4C to describe how the frame selection unit 130 according to at least one embodiment of the present disclosure extracts similar area information. While the following describes a method of extracting similar area information from two previous frames, this is for illustrative purposes only and the method may be equally applicable to one or more previous frames and/or one or more next frames.

Figure 4A:
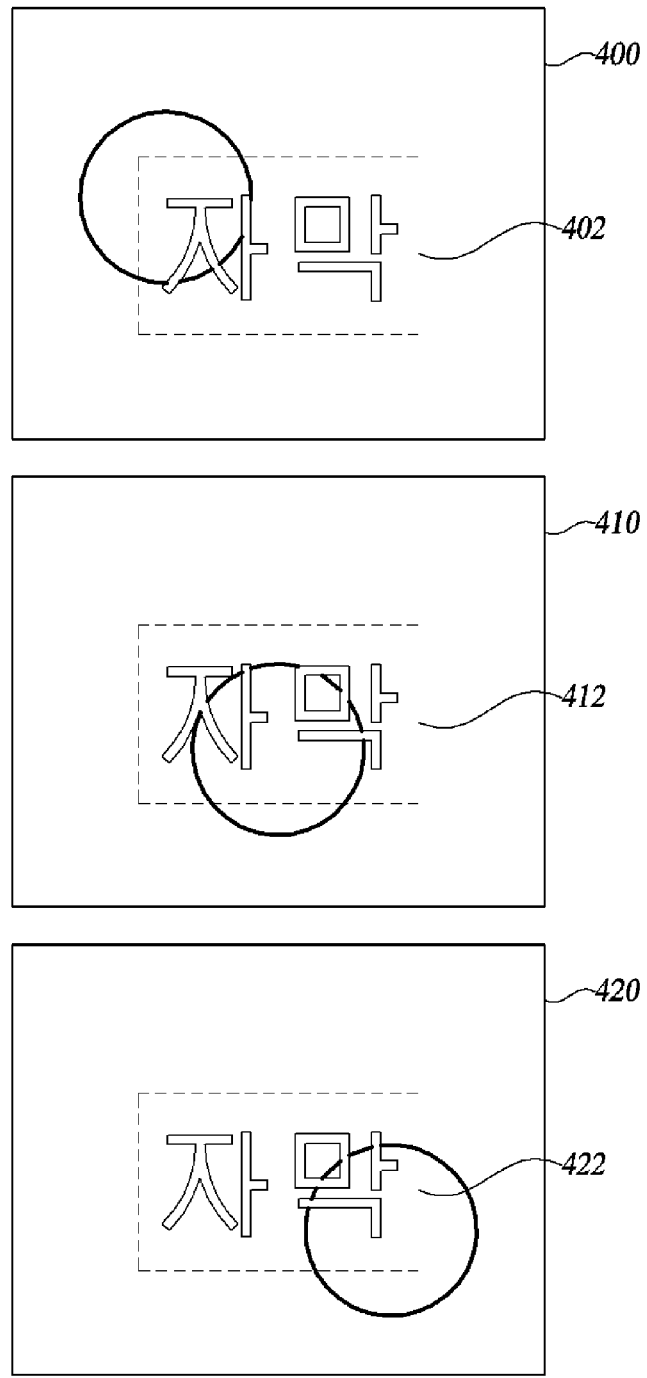

FIG. 4A illustrates an example in which a circle shape moves to the lower right corner of a frame over time. FIG. 4A depicts a target frame ($f_t$) 420 from which subtitles are to be removed at time t, and previous frames ($f_{t-2}$, $f_{t-1}$) 400 and 410 located temporally before the target frame. While FIG. 4A illustrates an example in which the previous frames 400 and 410 are subtitled, i.e., detected areas 402 and 412 are included within the previous frames 400 and 410, this is for illustrative purposes only and the previous frames 400 and 410 may not be subtitled or may be subtitled with different content from the target frame 420.

Figure 4B:
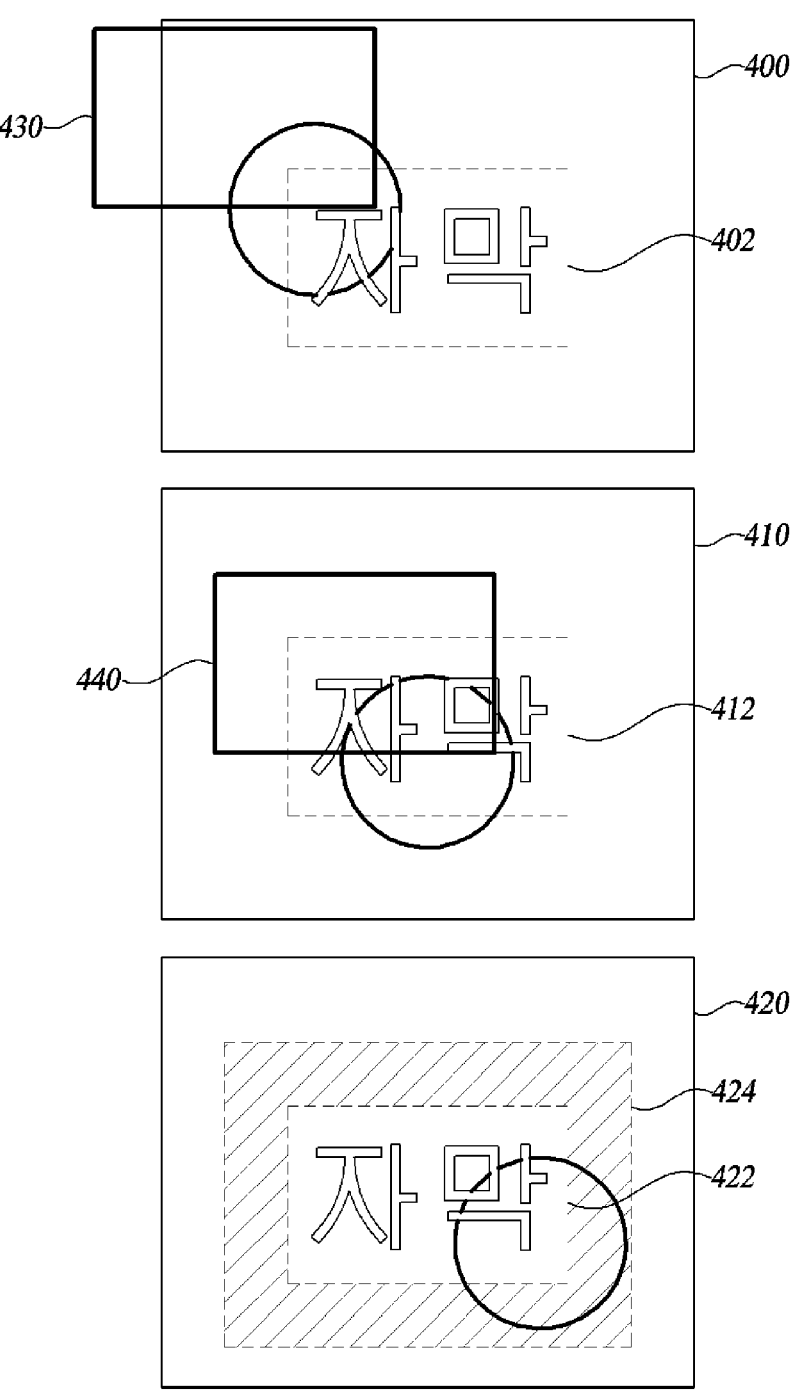
Figure 4C:
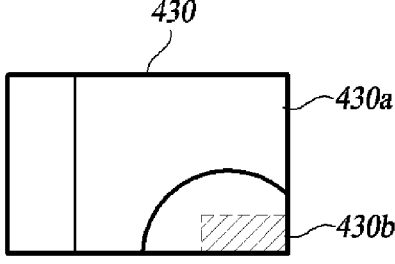
Figure 4C:
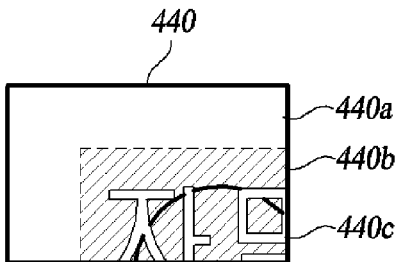

As shown in FIG. 4B, the frame selection unit 130 according to at least one embodiment of the present disclosure performs template matching to find similar areas 430 and 440 that have the highest similarity to the target frame 420 from the previous frames 400 and 410, by using a neighbor area 424 of the target frame 420.

While FIG. 4B illustrates an example of performing template matching using all of the neighboring pixels of the detected area 422, template matching may be performed by dividing the neighboring pixels of the detected area 422 into blocks. Further, the method of performing template matching encompasses any method that can be readily employed by a person having ordinary skill in the art and is not limited to any particular method.

The frame selection unit 130 according to at least one embodiment of the present disclosure may calculate the similarity between certain areas by using a sum of absolute differences (SAD) and/or mean square difference (MSD), but is not limited to these examples, and a person having ordinary skill in the art may use other methods to calculate the similarity between certain areas. The frame selection unit 130 does not calculate similarity for the inner areas of the target frame 420 and the previous frames 400 and 410.

The frame selection unit 130 according to at least one embodiment of the present disclosure selects, as the backward reference frame, the previous frames 400 and 410 in which similar areas 430 and 440 having similarity higher than a predetermined threshold similarity are detected. In other words, if there are no areas with similarity higher than the predetermined threshold similarity in the previous frames 400 and 410, these previous frames are not selected as the backward reference frame.

The frame selection unit 130 according to at least one embodiment of the present disclosure extracts similar area information and information on the distance between the target frame and the previous frame for the previous frames 400 and 410 selected as the backward reference frame.

The similar area information may include similarity, location information of the similar area, and/or information about one or more areas subdivided from the similar area.

The frame selection unit 130 according to at least one embodiment of the present disclosure may divide the similar area into at least one or more areas based on the position of the subtitle within the reference frame, and assign different indices and/or weights to the divided areas. For example, as shown in FIG. 4C, the frame selection unit 130 divides the similar areas 430 and 440 into outer areas 430a and 440a, inner areas 430b and 440b, and subtitle area 440c, and assigns a different index and/or weight to each area. For example, the outer areas 430a and 440a may be assigned a value of "2", the inner areas 430b and 440b may be assigned a value of "1", and the subtitle area 440c may be assigned a value of "0." Using the assigned indices and/or weights, the frame selection unit 130 may divide the similar areas 430 and 440 into areas that are valid, important, noteworthy, etc. for inpainting.

On the other hand, the frame selection unit 130 according to another embodiment of the present disclosure may select a reference frame by using a motion vector of a video codec instead of template matching and extract information about a similar area and information on the distance between the target frame and the reference frame.

Figure 5:
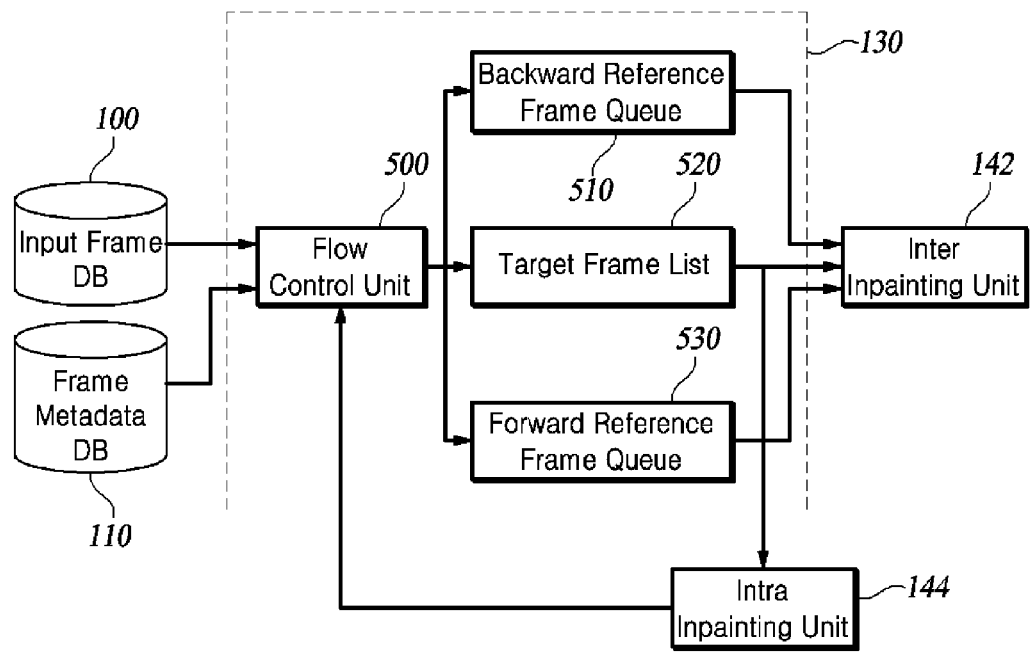
FIG. 5 illustrates a frame selection unit according to a second embodiment of the present disclosure.
Figure 6:
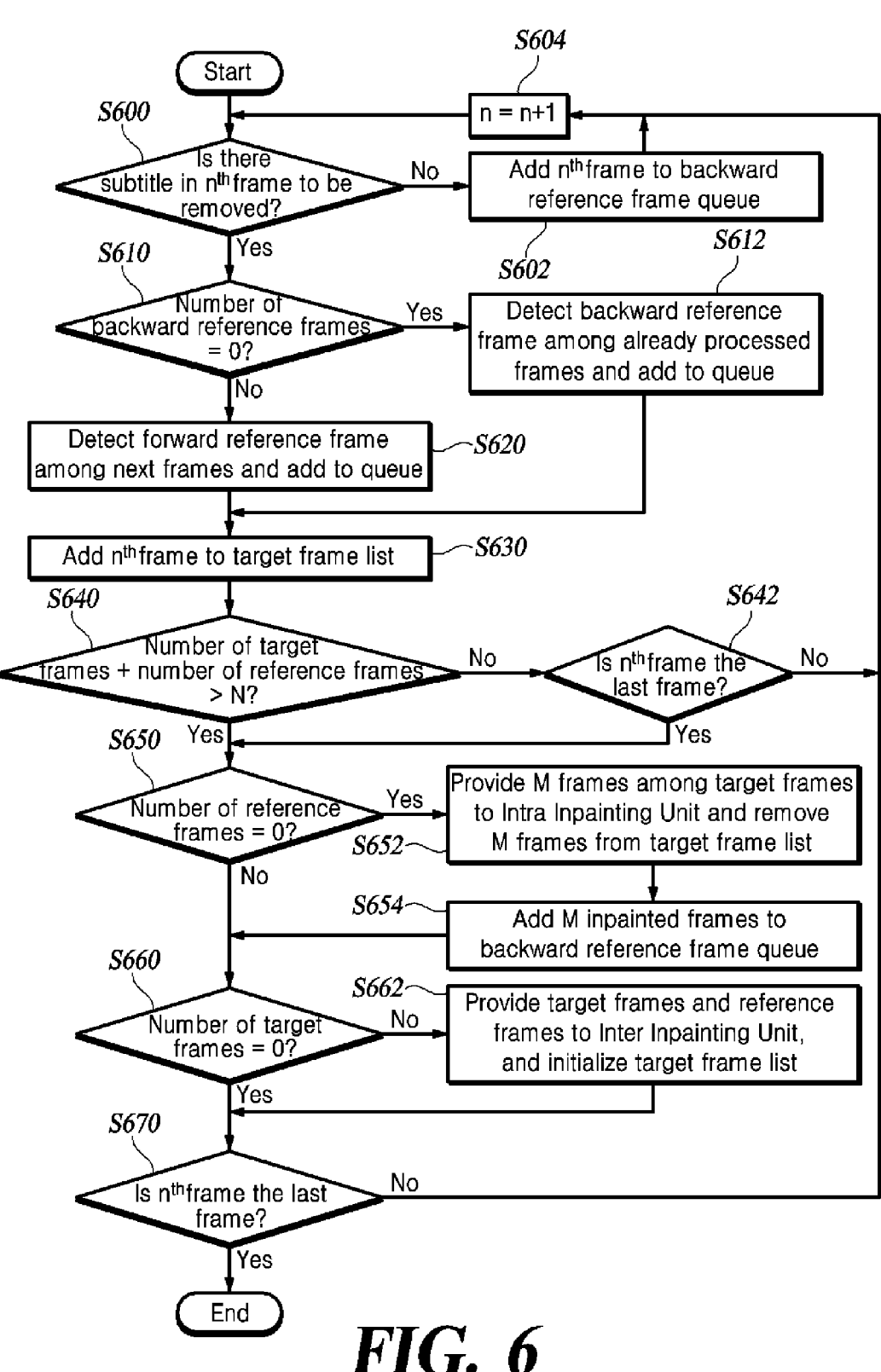
FIG. 6 is a flowchart of a frame selection process according to a second embodiment of the present disclosure.

Referring now to FIG. 5 and FIG. 6, a frame selection unit according to a second embodiment of the present disclosure will be described.

FIG. 5 illustrates a frame selection unit according to a second embodiment of the present disclosure.

As shown in FIG. 5, the frame selection unit 130 according to at least one embodiment of the present disclosure includes all or some of a flow control unit 500, a backward reference frame queue 510, a target frame list 520, and a forward reference frame queue 530. Not all of the blocks shown in FIG. 5 are requisite components, and in other embodiments, some of the blocks included in the frame selection unit 130 may be added, changed, or deleted.

The flow control section 500 determines a target frame, a backward reference frame, and a forward reference frame from the input frames based on the frame metadata. In this case, the reference frames refer to frames temporally adjacent to the target frame and having highly correlated pixel values that can replace the subtitles of the target frame. Further, a backward reference frame means a reference frame located temporally before the target frame, and a forward reference frame means a reference frame located temporally after the target frame.

According to at least one embodiment of the present disclosure, in selecting the reference frame, the flow control unit 500 may select the reference frame from among the processed frames on which the inpainting process is completed but may select the processed frame having an inpainted area that does not overlap the inpainting area in the target frame as the reference frame. For example, the reference frame may not include subtitles or, even if it does, may have a subtitle area that does not overlap the subtitle area of the target frame.

According to at least one embodiment of the present disclosure, the flow control unit 500 sequentially checks the input frames in chronological order to determine a target frame, and allows the backward reference frame and/or the forward reference frame that is temporally closest to the determined target frame to be loaded into the backward reference frame queue 510 and/or the forward reference frame queue 530.

According to at least one embodiment of the present disclosure, the flow control unit 500 may sequentially check the input frames in chronological order to select frames that do not contain subtitles as backward reference frames and frames that do contain subtitles as target frames. The flow control unit 500 may check one or more frames that are temporally after the selected target frame in chronological order and select the frame that does not include the subtitle as the forward reference frame.

According to at least one embodiment of the present disclosure, the flow control unit 500 determines the target frame and the reference frame on a scene-by-scene basis based on the scene transition information provided by the frame metadata DB 110. That is, the flow control unit 500 selects the target frame and the reference frame from among the input frames within the same scene based on the scene transition information extracted from image. Specifically, the flow control unit 500 initializes the backward reference frame queue 510 and the forward reference frame queue 530 when a scene transition occurs, thereby preventing a frame with a low correlation to the target frame from being used as the reference frame.

According to at least one embodiment of the present disclosure, the flow control unit 500 organizes N frames (N=natural number) into one unit of frame processing, and when the sum of the number of target frames (T), the number of backward reference frames (B), and the number of forward reference frames (F) becomes N frames, providing target frames and/or reference frames to at least one of the inter inpainting unit 142 or the intra inpainting unit 144.

Specifically, if there are no reference frames within the N frame processing units (B+F=0), the flow control unit 500 provides the intra inpainting unit 144 with M (M=natural number) target frames out of the T target frames in the target frame list 520, and adds the M inpainted frames to the backward reference frame queue 510 for use as reference frames. On the other hand, if there are reference frames within N frame processing units (B+F>0), the flow control unit 500 provides the inter inpainting unit 142 with T target frames, B backward reference frames, and F forward reference frames. At this time, the flow control unit 500 may also provide the intra inpainting unit 144 with the T target frames.

In other words, when no frame is selected as the reference frame, the inpainting unit 140 may perform intra inpainting, and when there is a frame selected as the reference frame, the inpainting unit 140 may perform inter inpainting. According to embodiments, the inpainting unit 140 may perform at least one of inter inpainting or intra inpainting when the sum of the number of target frames and the number of reference frames is greater than a preset unit of frame processing unit. According to embodiments, when no frame is selected as a reference frame, the inpainting unit 140 may perform the intra inpainting on some of the target frames to generate an inpainted frame and may use the inpainted frame as a reference frame to perform inter inpainting on the remaining frames among the target frames.

A specific description of the flow control unit 500 determining the target frame and the reference frame will be presented with reference to FIG. 6A and FIG. 6B.

The backward reference frame queue 510 stores the backward reference frames determined by the flow control unit 500. The forward reference frame queue 530 stores forward reference frames determined by the flow control unit 500. The reference frame queue 510 and 530 each insert new reference frames and/or remove the oldest reference frames, based on a preset maximum number of frames, to allow the backward reference frame and/or forward reference frame that is closest in time to the target frame to be loaded into the backward reference frame queue 510 and/or forward reference frame queue 530. The reference frame queues 510 and 530 each provide the inter inpainting unit 142 with at least one backward reference frame and/or at least one forward reference frame under the control of the flow control unit 500.

The target frame list 520 stores target frames determined by the flow control unit 500. The target frame list 520 provides at least one target frame to at least one of the inter inpainting unit 142 or the intra inpainting unit 144 under the control of the flow control unit 500.

FIG. 6 is a flowchart of a frame selection process according to a second embodiment of the present disclosure.

The flow control unit 500 checks whether the $n^{th}$ (n=natural number) frame among the input frames has subtitles to be removed (S600). When the $n^{th}$ frame does not have subtitles to be removed, the flow control unit 500 adds the $n^{th}$ frame to the backward reference frame queue 510 (S602), increases n by 1, and repeats the frame selection process from the beginning (S604). In other words, the flow control unit 500 checks the input frames chronologically and sequentially to determine whether the frames have subtitles to be removed.

When the $n^{th}$ frame has subtitles to be removed, the flow control unit 500 checks if a backward reference frame exists in the backward reference frame queue 510 (S610).

When no backward reference frame exists, the flow control unit 500 detects a backward reference frame among the frames on which the subtitle removal process is completed and adds the detected backward reference frame to the backward reference frame queue 510 (S612). Specifically, the flow control unit 500 detects, among the already processed frames that underwent the subtitle removal, a frame having a subtitle area that does not overlap with the subtitle area of the $n^{th}$ frame as a backward reference frame, and adds the detected frame to the backward reference frame queue 510.

The flow control unit 500 detects a forward reference frame among the next frames located after the $n^{th}$ frame and adds the detected forward reference frame to the forward reference frame queue 530 (S620). Specifically, the flow control unit 500 sequentially checks whether a subtitle exists from the $(n+1)^{th}$ frame to a frame at a point in time before the next scene transition occurs, and adds a frame that does not have a subtitle to be removed to the forward reference frame queue 530. In other words, the flow control unit 500 adds to the forward reference frame queue 530 forward reference frames beginning with the one that is temporally close to the $n^{th}$ frame and adds a preset maximum number or less of forward reference frames to the forward reference frame queue 530.

The flow control unit 500 adds the $n^{th}$ frame to the target frame list 520 (S630).

The flow control unit 500 determines whether the sum (T+B+F) of the number of target frames stored in the target frame list 520 and the number of reference frames stored in the backward reference frame queue 510 and the forward reference frame queue 530 is greater than N, which is a unit of frame processing (S640).

When the sum of the number of target frames and the number of reference frames is less than the frame processing unit N, the flow control unit 500 determines whether the $n^{th}$ frame is the last frame (S642). Here, the last frame means the last frame among all the input frames or the last frame before the next scene transition occurs.

When the $n^{th}$ frame is not the last frame, the flow control unit 500 increases n by 1 and repeats the frame selection process from the beginning (S604). In other words, the flow control unit 500 adjusts the number of frames to be inpainted based on the frame processing unit and the scene transition time point.

When the sum of the number of target frames and the number of reference frames is greater than the frame processing unit N, or when the $n^{th}$ frame is the last frame, the flow control unit 500 checks whether the number of reference frames is zero.

When the number of reference frames is zero, the flow control unit 500 provides the intra inpainting unit 144 with M frames (M=natural number) of the target frames stored in the target frame list 520, and removes those M frames from the target frame list 520 (S652). Accordingly, the intra inpainting unit 144 performs intra inpainting for the M target frames.

The flow control unit 500 adds the M frames inpainted by the intra inpainting unit 144 to the backward reference frame queue 510 for use as reference frames (S654).

When the number of reference frames is not zero as a result of the check in Step S650, or after adding the reference frames to the backward reference frame queue 510 in Step S654, the flow control unit 500 checks whether the number of target frames is zero (S660).

When the number of target frames is not zero, the flow control unit 500 provides the inter inpainting unit 142 with the target frames stored in the target frame list 520 and the reference frames stored in the backward reference frame queue 510 and the forward reference frame queue 530, and initializes the target frame list 520 (S662). Accordingly, the inter inpainting unit 142 performs intra inpainting for all target frames stored in the target frame list 520. On the other hand, the flow control unit 500 according to another embodiment of the present disclosure may provide the target frames stored in the target frame list 520 to the intra inpainting unit 144 before initializing the target frame list 520.

The flow control unit 500 checks (S670) whether the $n^{th}$ frame is the last frame. Here, the last frame means the last frame among all the input frames or the last frame before the next scene transition occurs.

When the $n^{th}$ frame is not the last frame, the flow control unit 500 increases n by 1 and repeats the frame selection process from the beginning (S604). That is, the flow control unit 500 selects one or more target frames to remove the subtitles from, among the frames located temporally after the $n^{th}$ frame and selects a frame(s) that is/are highly correlated with the target frames as a reference frame(s).

When the $n^{th}$ frame is not the last frame, the flow control unit 500 terminates the frame selection process. On the other hand, when the $n^{th}$ frame is the last frame before the next scene transition occurs, the flow control unit 500 may initialize the backward reference frame queue 510 and the forward reference frame queue 530 and repeat the frame selection process from the beginning.

Referring now to FIGS. 7 through 10, an inter inpainting unit according to at least one embodiment of the present disclosure will be described.

The inter inpainting unit 142 utilizes the similarity between the target frame and the reference frame to obtain, from the reference frames that are highly correlated to the target frame, new pixel values to replace the values of the pixels at the positions of the subtitles to be removed from the target frame, and synthesizes the obtained pixel values to perform local image inpainting.

Figure 7:
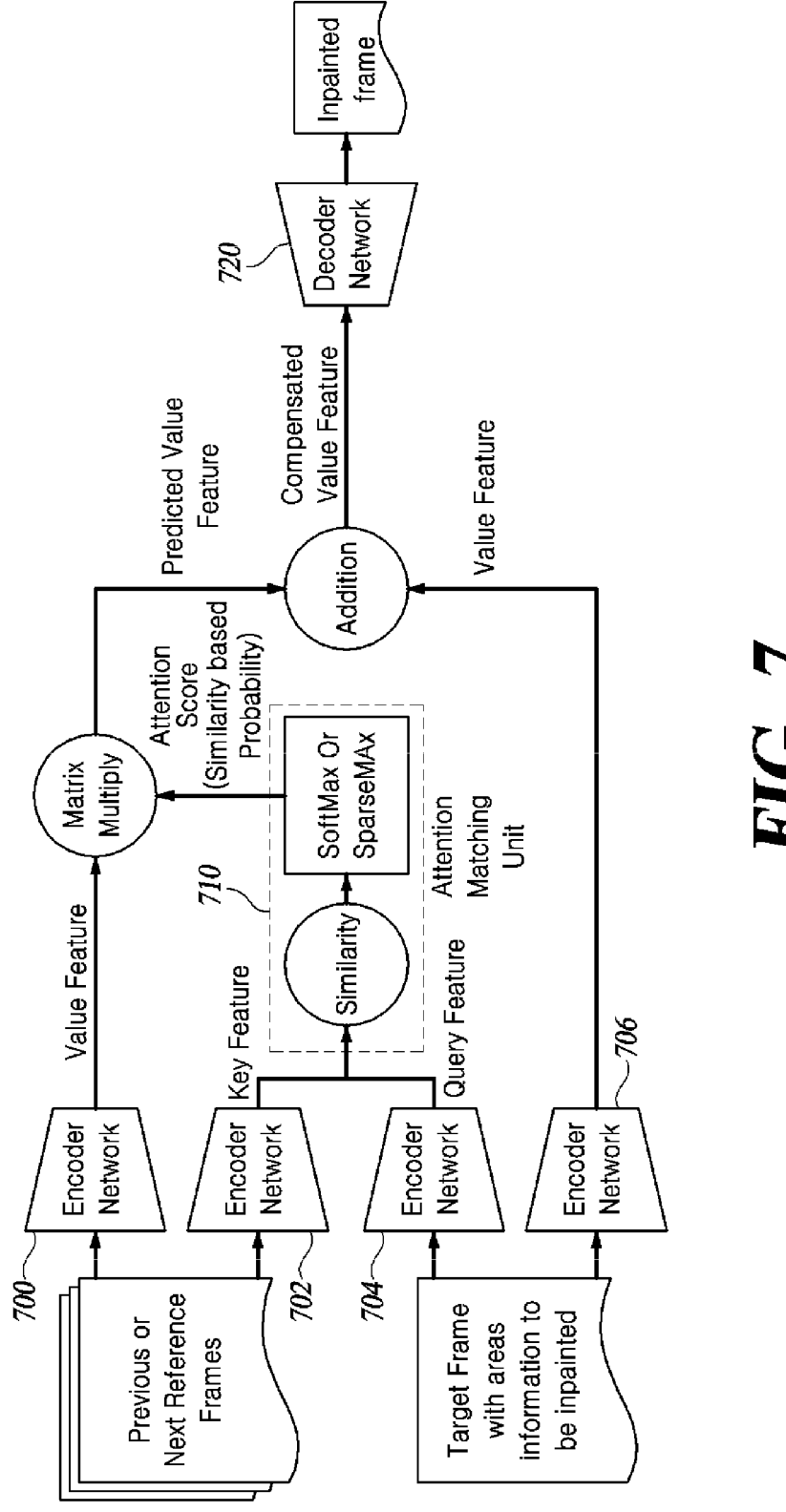
FIG. 7 is a diagram for illustrating a network of an inter inpainting unit according to at least one embodiment of the present disclosure.

FIG. 7 is a diagram for illustrating a network of an inter inpainting unit according to at least one embodiment of the present disclosure.

As shown in FIG. 7, the inter inpainting unit 142 uses encoder networks 700 to 706 trained by a neural network-based autoencoder to extract a value feature, a key feature, and a query feature as features of a target frame and a reference frame.

The inter inpainting unit 142 uses an attention matching unit 710 to perform attention matching between the query feature of the neighbor area adjacent to the subtitle area in the target frame and the key feature of the reference frame, and calculates an attention score. Based on the attention score, the inter inpainting unit 142 finds in the reference frame a similar area that has a high similarity to the detected area in the target frame. The attention matching unit 710 according to at least one embodiment of the present disclosure will be described below with FIGS. 8A to 9.

The inter inpainting unit 142 may generate an inpainted frame based on the calculated similarity. The inter inpainting unit 142 may generate a compensated value feature to fill in the subtitle area of the target frame, and input the generated compensated value feature to the decoder network 720 to generate the final inpainted pixels.

Figure 8A:
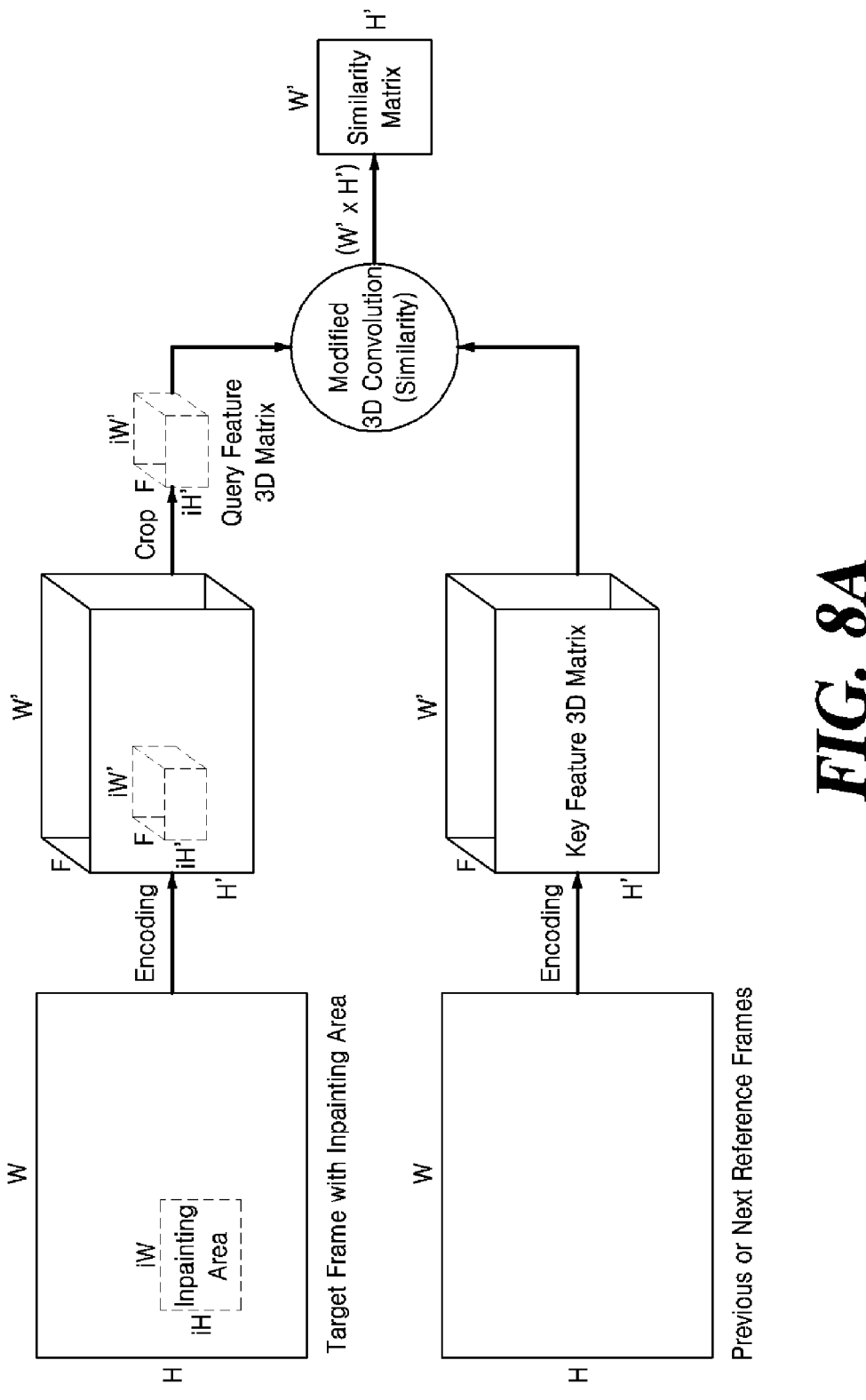
FIG. 8A and FIG. 8B are diagrams for illustrating a similarity calculation between a target frame and a reference frame according to at least one embodiment of the present disclosure.
Figure 8B:
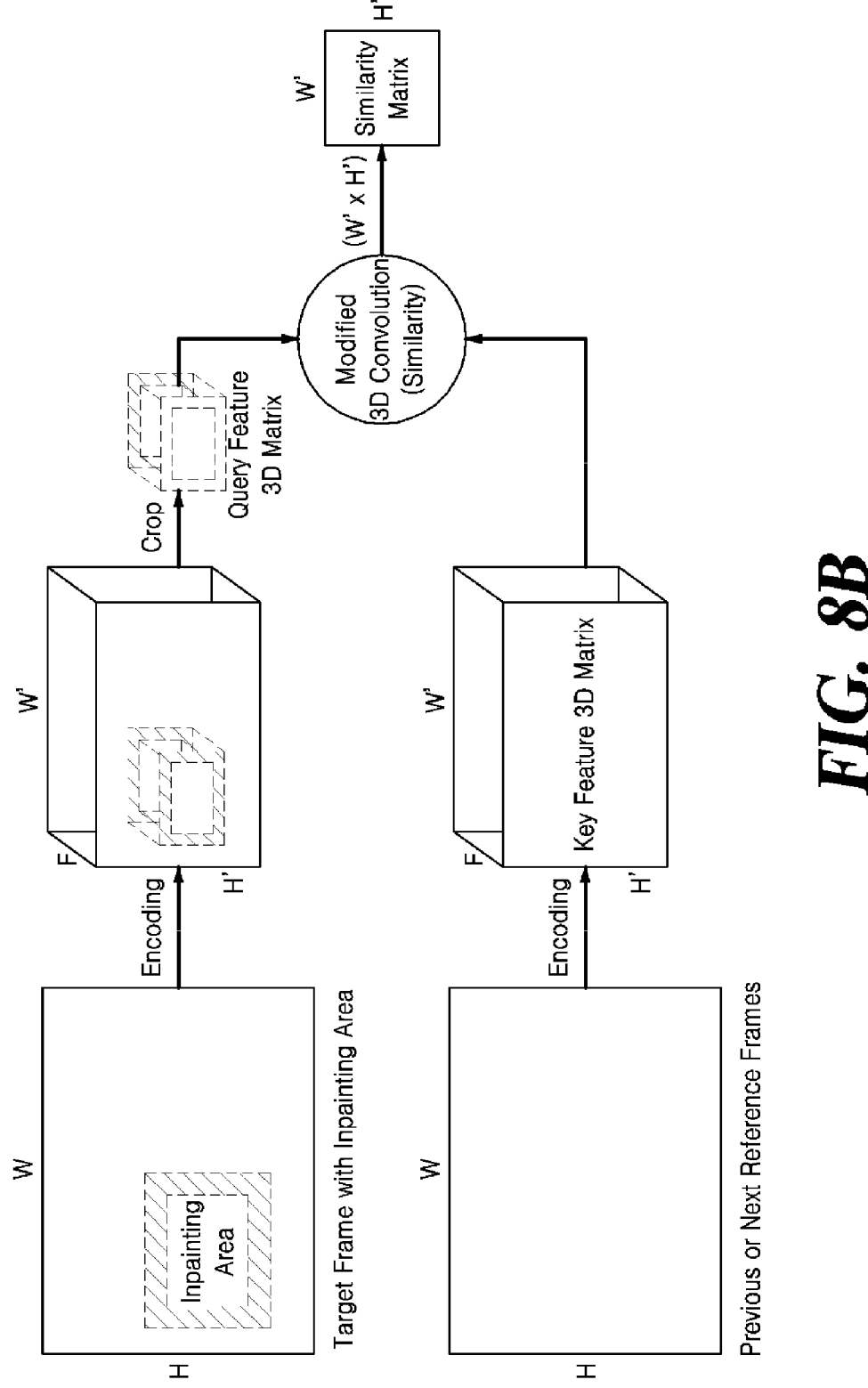
Figure 9:
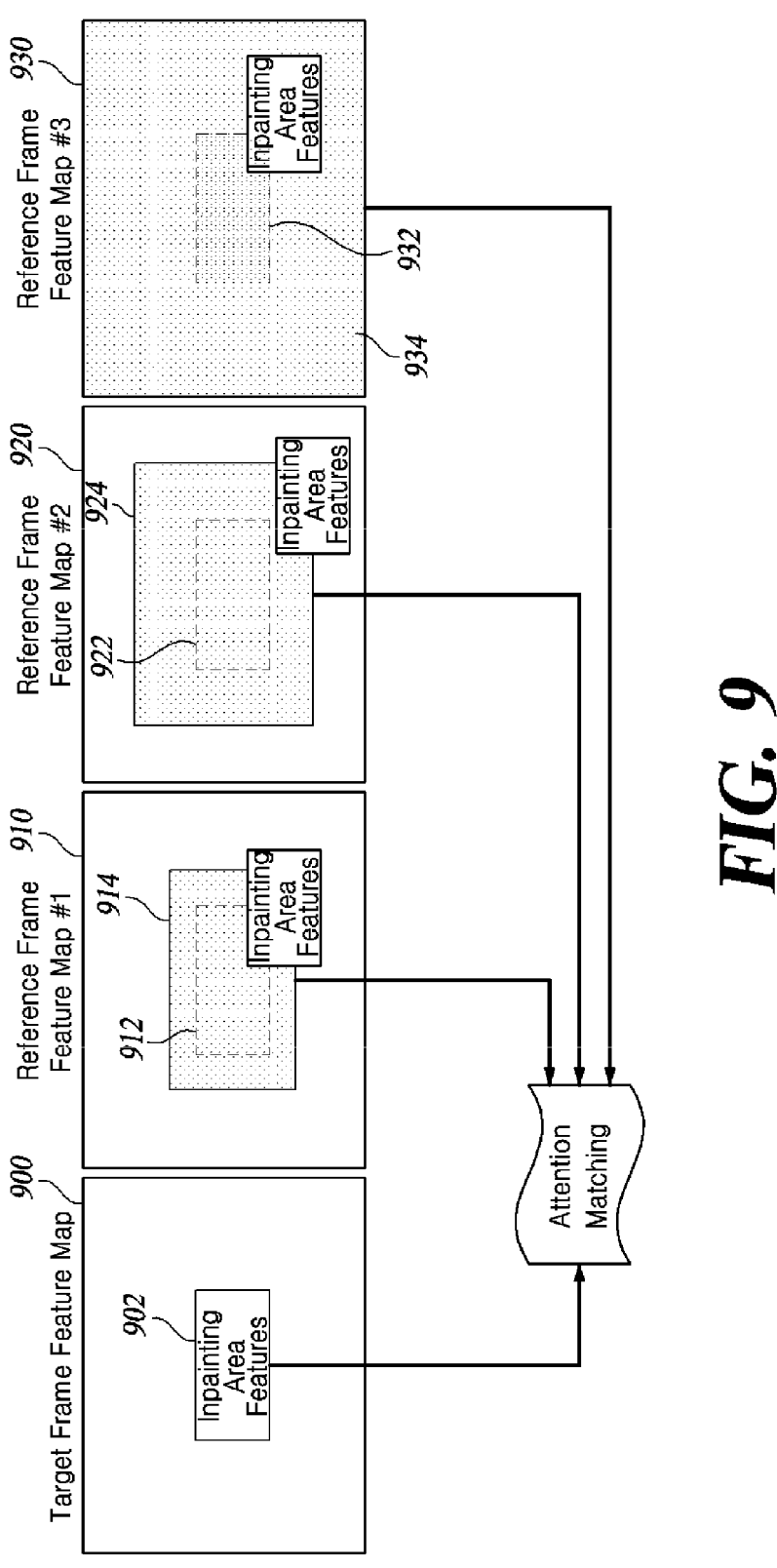
FIG. 9 is a diagram for illustrating feature indexing of a reference frame for attention matching, according to at least one embodiment of the present disclosure.

Referring now to FIGS. 8A through 9, an attention matching unit 710 according to at least one embodiment of the present disclosure will be described.

The following first describes a method in which the attention matching unit 710 according to at least one embodiment of the present disclosure calculates the similarity between a target frame and a reference frame by using a modified three-dimensional convolution.

FIG. 8A and FIG. 8B are diagrams for illustrating a similarity calculation between a target frame and a reference frame according to at least one embodiment of the present disclosure.

FIG. 8A illustrates a similarity calculation method using feature information of an inpainting area according to at least one embodiment of the present disclosure.

A conventional attention matching unit uses matrix multiplication to obtain a similarity between a key feature vector and a query feature vector, that is, a similarity between vectors. However, since these methods only calculate the correlation for a single point, i.e., a small area, that has passed through the neural network, the similarity between large areas cannot be calculated using the surrounding pixels to be inpainted. Whereas, the attention matching unit 710 according to at least one embodiment of the present disclosure uses convolution to calculate the similarity between the key feature matrix and the query feature matrix, that is, the similarity between the matrices.

As shown in FIG. 8A, an encoder according to at least one embodiment of the present disclosure receives a target frame and a reference frame having (W, H) sizes as input and generates a three-dimensional matrix having (W', H', F) sizes. For example, the encoder may generate a query feature matrix from the target frame and generate a key feature matrix from the reference frame. In this case, W and H' are the frame sizes scaled by the encoder, and F is the number of features extracted by the encoder. Similarly, if the inpainting area contained in the target frame has (iW, iH) sizes, the inpainting area scaled by the encoder has (iW', iH') sizes. Therefore, the query feature matrix obtained by extracting only the three-dimensional matrix of the area to be inpainted from the three-dimensional matrix for the target frame has (iW', iH', F) sizes. Meanwhile, the key feature matrix is a three-dimensional matrix for the reference frame and has (W, H', F) sizes.

The attention matching unit 710 according to at least one embodiment of the present disclosure calculates a similarity matrix by using a modified 3D convolution between the query feature matrix and the key feature matrix. The mathematical representation of the modified three-dimensional convolution is shown in Equation 1.

$$s_{ij} = \sum_{h}^{IH'} \sum_{w}^{IW'} \sum_{f=0}^{F} Q_{h,w,f} \times K_{i+h,j+w,f} \qquad \text{Equation 1}$$

Here, S is a similarity matrix, Q is a query feature matrix, and K is a key feature matrix. Each component of the similarity matrix may represent a similarity between the query feature matrix and a matrix including at least a portion of the key feature matrix.

The attention matching unit 710 according to at least one embodiment of the present disclosure applies a SoftMax or SparseMax function to the similarity matrix to transform the similarity matrix into probability information.

As described above, a conventional attention matching unit calculates only the similarity between certain points in the target frame and the reference frame by first converting three-dimensional matrices to two-dimensional matrices and then using a matrix product between the two-dimensional matrices, but the attention matching unit 710 according to at least one embodiment of the present disclosure can calculate the similarity between certain areas in the target frame and the reference frame by using a convolution between the three-dimensional matrices.

FIG. 8B illustrates a similarity calculation method using feature information of a neighbor area according to at least one embodiment of the present disclosure.

As described in FIG. 8A, the attention matching unit 710 according to at least one embodiment of the present disclosure calculates the similarity by extracting features of the inpainting area to be inpainted. On the other hand, referring to FIG. 8B, the attention matching unit 710 according to another embodiment of the present disclosure extracts features of the inpainting area's neighbor area, not the inpainting area, and generates a query feature matrix.

In other words, according to embodiments, the query feature matrix may be generated from the inpainting area or the neighbor area of the inpainting area.

The following describes a method in which the attention matching unit 710, according to at least one embodiment of the present disclosure, adaptively performs feature indexing based on an estimated amount of between a target frame and a reference frame.

FIG. 9 is a diagram for illustrating feature indexing of a reference frame for attention matching, according to at least one embodiment of the present disclosure.

To perform attention matching with the features of the inpainting area of the target frame, the conventional attention matching unit indexes and uses all the available (valid) features of the reference frame. However, because statistically the amount of movement that occurs between adjacent frames on an image sequence is small, it is likely that a high attention score will be obtained when all valid features of the reference frame are computed using features extracted from locations adjacent to the inpainting area of the target frame. In other words, indexing features of the reference frame to the entire frame is computationally expensive and may result in unexpected quality degradation due to incorrect attention matching.

The attention matching unit 710 according to at least one embodiment of the present disclosure variably performs feature indexing of the reference frame by estimating the amount of movement of the target frame and the reference frame.

In generating the key feature matrix, the attention matching unit 710 according to at least one embodiment of the present disclosure may perform feature indexing for each of at least one or more reference frames based on the amount of movement between the target frame and the reference frame.

The attention matching unit 710 according to at least one embodiment of the present disclosure may determine, in each reference frame, a valid area subject to feature indexing based on the amount of movement between the target frame and each reference frame, with respect to an area in each reference frame with the same size and position as the inpainting area of the target frame. In other words, the attention matching unit 710 performs feature indexing on features included in valid areas 914, 924, and 934. For example, referring to FIG. 9, the attention matching unit 710 may extend the valid areas 914, 924, and 934 around the areas 912, 922, and 932 at the same location as the inpainting area 902 of the target frame within the reference frame.

The attention matching unit 710 according to at least one embodiment of the present disclosure estimates the amount of movement between the target frame and the reference frame and determines the extent of expansion of the valid area based on the estimated amount of movement. In other words, the attention matching unit 710 adaptively adjusts the sizes of the valid areas 914, 924, and 934 based on the estimated amount of movement between the target frame and the reference frame. For example, the attention matching unit 710 reduces the size of the valid area when the estimated amount of movement between the target frame and the reference frame is small and increases the size of the valid area when the estimated amount of movement between the target frame and the reference frame is large.

As shown in FIG. 9, a first reference frame feature map 910 represents a feature map extracted from a reference frame having a small estimated amount of movement, a second reference frame feature map 920 represents a feature map extracted from a reference frame having a medium estimated amount of movement, and a third reference frame feature map 930 represents a feature map extracted from a reference frame having a large estimated amount of movement. Therefore, as shown in FIG. 9, the valid area 914 of the first reference frame feature map 910 is determined to be the smallest in size, and the valid area 934 of the third reference frame feature map 930 is determined to be the largest.

The attention matching unit 710 according to at least one embodiment of the present disclosure may estimate the amount of movement based on a temporal distance between the target frame and the reference frame. For example, the attention matching unit 710 may estimate that the greater the temporal distance between the target frame and the reference frame, the greater the amount of movement. According to other embodiments of the present disclosure, the attention matching unit 710 may estimate the amount of movement based on how much the pixels in an area adjacent to the inpainting area in the target frame have shifted from the reference frame. The method of estimating the amount of movement of the attention matching unit 710 is not limited to the foregoing examples, and one having ordinary skill in the art may utilize other methods to estimate the amount of movement between frames.

Figure 10:
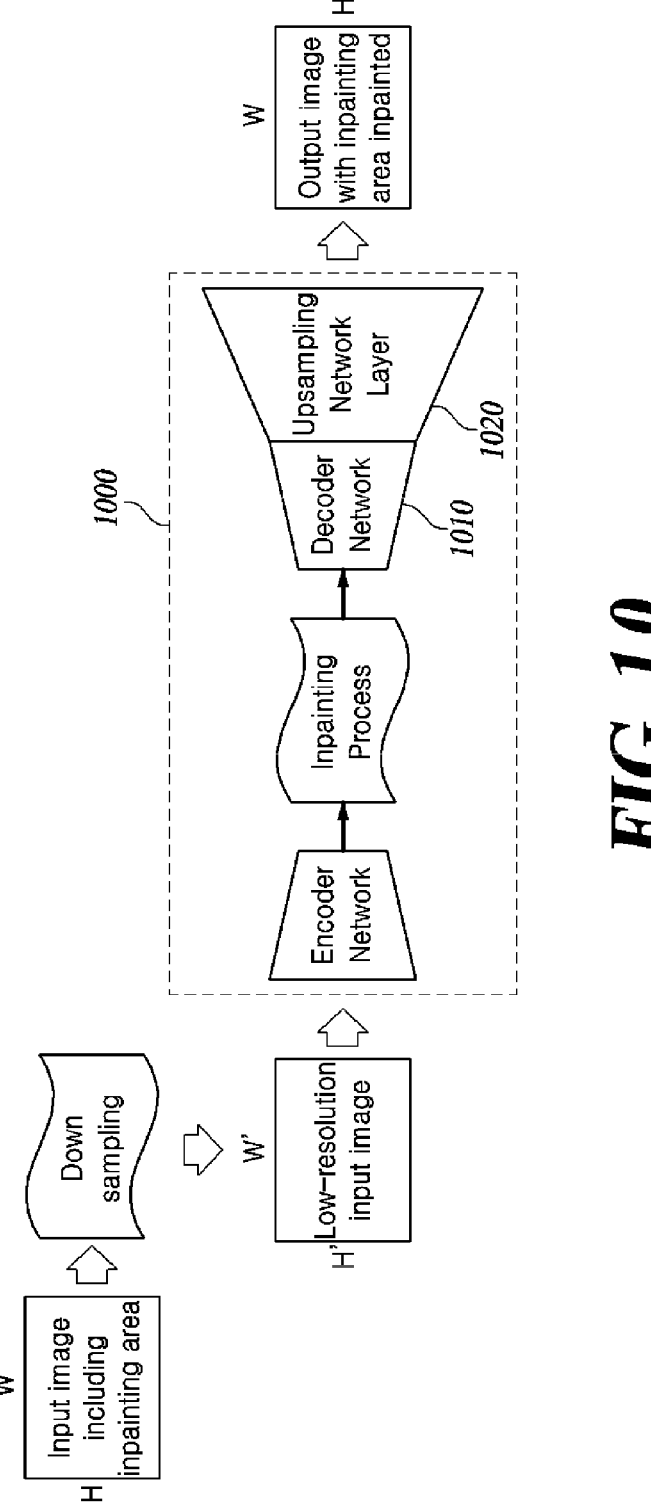
FIG. 10 is a diagram for illustrating an autoencoder network having an asymmetric input-output structure, according to at least one embodiment of the present disclosure.

Referring now to FIG. 10, an autoencoder network having an asymmetric input-output structure according to at least one embodiment of the present disclosure will be described.

FIG. 10 is a diagram illustrating an autoencoder network having an asymmetric input-output structure, according to at least one embodiment of the present disclosure.

A conventional autoencoder network is designed with a symmetrical structure in which the resolution of the input image is the same as that of the output image. Therefore, the larger the resolution of the input image, the more the computation and the more memory usage of the network, and to solve this drawback, the process of inpainting the image through the structure of a downsampler, autoencoder, upsampler, and compositing unit is divided into four steps.

Here, the downsampler downsamples an input image of (W, H) sizes including the inpainting area to (W, H') sizes, and inputs the downsampled input image to the autoencoder network. The autoencoder network may perform inpainting on the inpainting area included in the input image, and may correspond to the network of inter inpainting units 142 as described in the section referring to FIG. 7. The upsampler upsamples the output of the autoencoder network having (W, H') sizes to inpaint the output image to the original resolution and (W, H) sizes. The compositing unit generates the final inpainted image by compositing the inpainted area of the output image with the non-inpainted area of the input image.

As shown in FIG. 10, an autoencoder network 1000 according to at least one embodiment of the present disclosure has an asymmetric input-output structure where the resolution of the input image is different from that of the output image. The output end of a decoder network 1010 according to at least one embodiment of the present disclosure has an upsampling network layer 1020 that enables the output of an image with the same resolution as the original resolution of the input image before it is downsampled. In other words, according to at least one embodiment of the present disclosure, the process of upsampling the output image to inpaint it to the original resolution is not performed in a separate upsampler in conjunction with the autoencoder network 1000 but is performed in the upsampling network layer 1020 fused to the decoder network 1010 within the autoencoder network 1000. This allows the autoencoder network to learn image inpainting and upsampling together, resulting in higher resolution than typical upsampling methods such as bicubic.

In other words, according to at least one embodiment of the present disclosure, an inpainted frame can be generated using the decoder network 1010 having the upsampling network layer 1020 at the output end, and the decoder network 1010 can output an inpainted frame with a resolution equal to the original resolution of the target frame.

Figure 11:
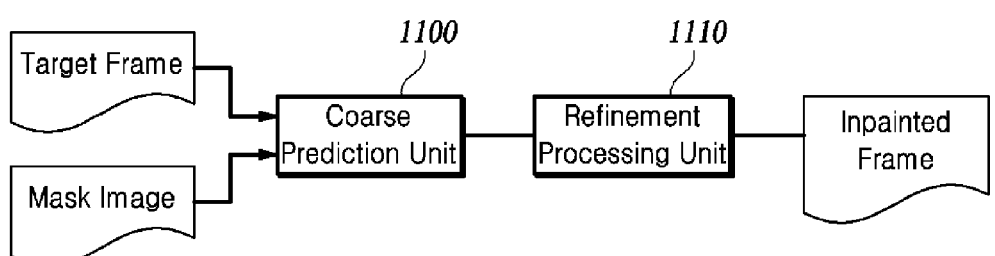
FIG. 11 is a diagram for illustrating an intra inpainting unit according to at least one embodiment of the present disclosure.
Figure 12:
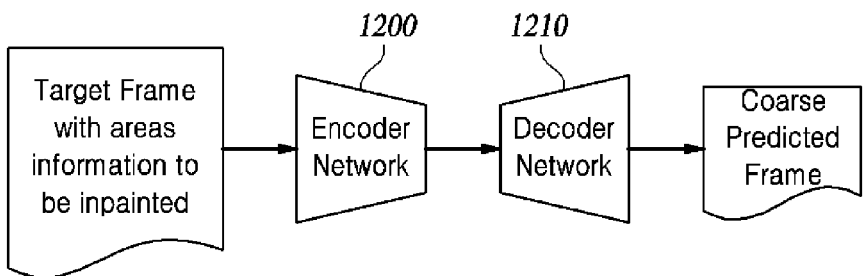
FIG. 12 is a diagram for illustrating a coarse prediction unit according to at least one embodiment of the present disclosure.
Figure 13:
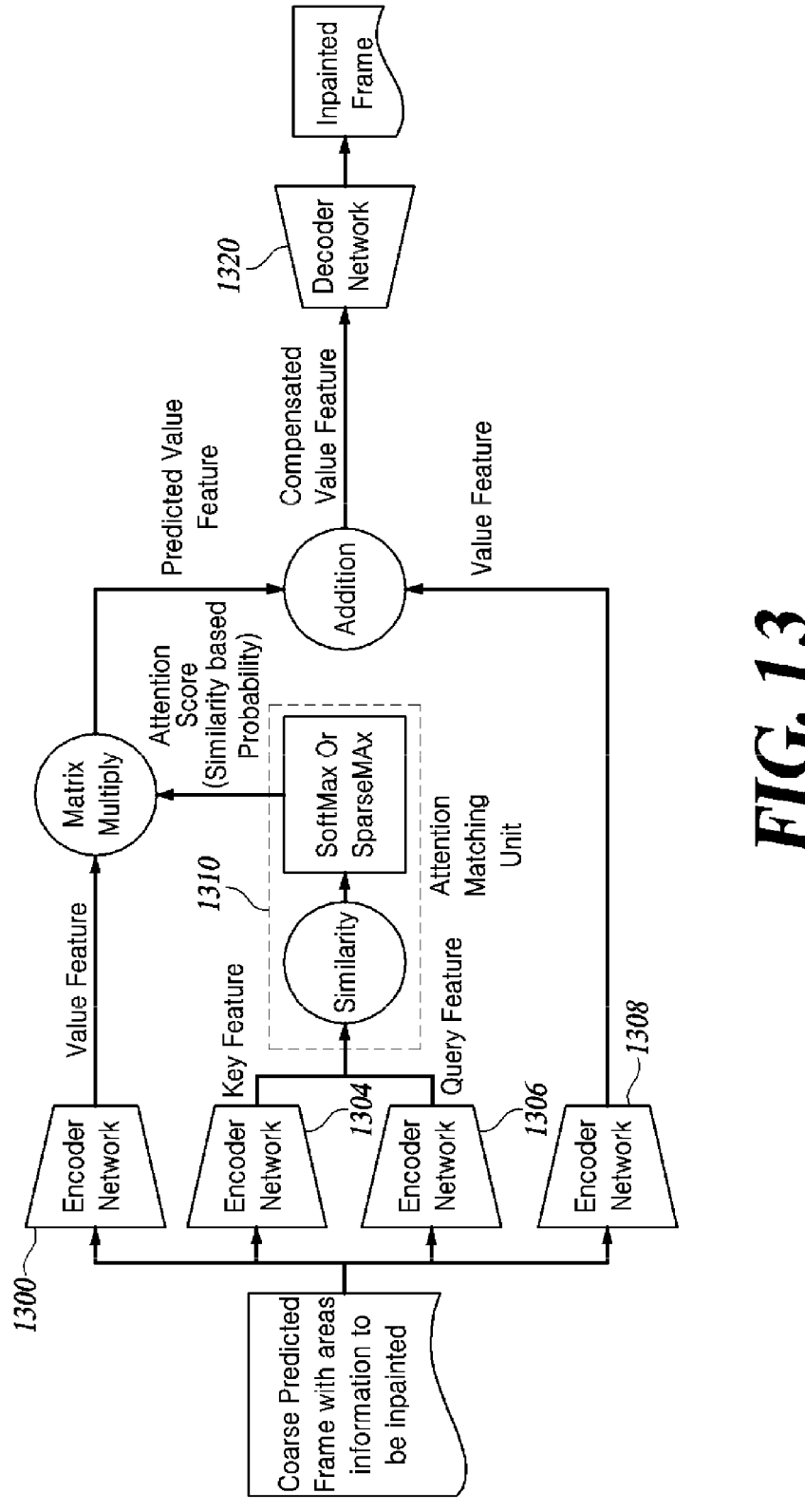
FIG. 13 is a diagram for illustrating a refinement process-ing unit according to at least one embodiment of the present disclosure.

Referring now to FIGS. 11 through 13, an intra inpainting unit according to at least one embodiment of the present disclosure will be described.

FIG. 11 is a diagram illustrating an intra inpainting unit according to at least one embodiment of the present disclosure.

The intra inpainting unit 144 according to at least one embodiment of the present disclosure utilizes similarities in the target frame to obtain new pixel values to replace pixel values at the location of the subtitle to be removed from the target frame from other locations in the target frame and synthesizes the obtained pixel values to perform local image inpainting.

As shown in FIG. 11, the intra inpainting unit 144 according to at least one embodiment of the present disclosure includes a coarse prediction unit 1100 and a refinement processing unit 1110. The coarse prediction unit 1100 initially generates a coarse predicted frame based on the target frame and the mask image. The refinement processing unit 1110 receives the coarse predicted frame as input and finally generates an inpainted frame.

FIG. 12 is a diagram illustrating a coarse prediction unit according to at least one embodiment of the present disclosure.

The coarse prediction unit 1100 according to at least one embodiment of the present disclosure analyzes image characteristics of a target frame to approximate new pixel values to replace the de-subtitled area.

As shown in FIG. 12, the coarse prediction unit 1100 according to at least one embodiment of the present disclosure includes an encoder network 1200 and a decoder network 1210 trained with a neural network-based autoencoder. The coarse prediction unit 1100 receives the target frame and mask image as input and generates a coarse predicted frame with its de-subtitled area replaced with new pixel values.

FIG. 13 is a diagram illustrating a refinement processing unit according to at least one embodiment of the present disclosure.

As shown in FIG. 13, the refinement processing unit 1110 according to at least one embodiment of the present disclosure uses encoder networks 1300 to 1308 trained by a neural network-based autoencoder to extract a value feature, a key feature, and a query feature as features of the target frame.

The refinement processing unit 1110 uses an attention matching unit 1310 to perform attention matching between the query feature of the de-subtitled area and the key feature of the other area in the target frame, and calculates an attention score. Based on the attention score, the refinement processing unit 1110 finds, in the target frame, similar areas that have high similarity to the subtitle area. The attention matching unit 1310 according to at least one embodiment of the present disclosure can perform attention matching in the same manner as the attention matching unit 710 of the inter inpainting unit 142 as described in the section referring to FIGS. 8A through 9.

The refinement processing unit 1110 generates a compensated feature vector to fill the subtitle area of the target frame and inputs the compensated feature vector into the decoder network 1320 to generate the final inpainted pixels.

Figure 14:
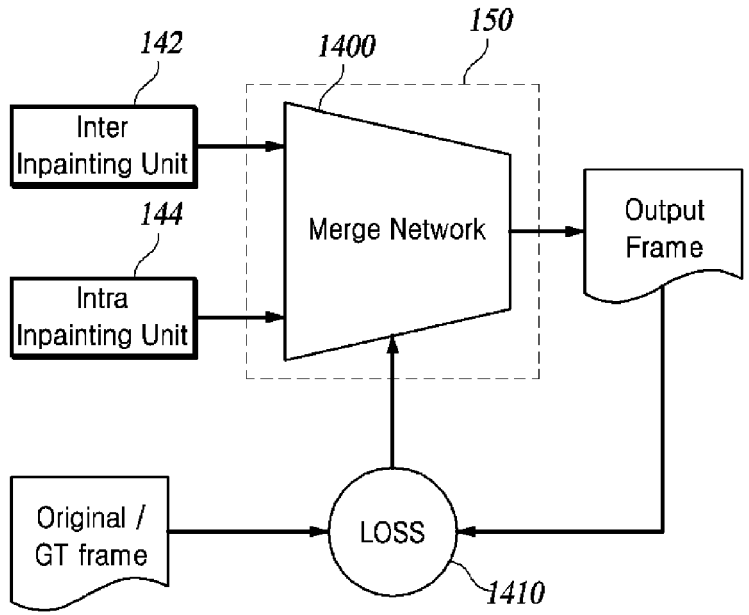
FIG. 14 is a diagram for illustrating merge network training according to at least one embodiment of the present disclosure.

Referring now to FIG. 14, a frame merging unit according to at least one embodiment of the present disclosure will be described.

The frame merging unit 150 according to at least one embodiment of the present disclosure synthesizes the output of the inter inpainting unit 142 and the output of the intra inpainting unit 144 or selects the either the output of the inter inpainting unit 142 or the output of the intra inpainting unit 144 for use as the final output frame.

The frame merging unit 150 according to at least one embodiment of the present disclosure may use an attention score to synthesize two inpainted frames or select one inpainted frame from the two inpainted frames. Specifically, the frame merging unit 150 may select as the final output frame the inpainted frame outputted by the inpainting unit that calculated a higher attention score between the inter inpainting unit 142 and the intra inpainting unit 144. Alternatively, the frame merging unit 150 may generate the final output frame by synthesizing the two inpainted frames in proportion to the attention scores calculated by the inter inpainting unit 142 and the intra inpainting unit 144, respectively.

For example, if the attention score of the inter inpainting unit 142 is 80 and the attention score of the intra inpainting unit 144 is 30, the frame merging unit 150 may select the inpainted frame outputted by the inter inpainting unit 142 as the final output frame or may synthesize the inpainted frame outputted by the inter inpainting unit 142 and the inpainted frame outputted by the intra inpainting unit 144 in a ratio of 80:30 to generate the final inpainted frame.

According to other embodiments of the present disclosure, the frame merging unit 150 may use a pre-trained model to synthesize two inpainted frames or select one inpainted frame from the two inpainted frames. Specifically, the frame merging unit 150 uses a pre-trained network for segmentation to extract features from the inpainted frame outputted by the inter inpainting unit 142 and the inpainted frame outputted by the intra inpainting unit 144, respectively. The frame merging unit 150 compares the extracted features and selects the inpainted frame with more features extracted as the final output frame, or synthesizes the two inpainted frames according to the proportion of features extracted to generate the final output frame.

For example, the frame merging unit 150 may use VGG-Net 16 as a pre-trained model. The frame merging unit 150 inputs the inpainted frame outputted by the inter inpainting unit 142 and the inpainted frame outputted by the intra inpainting unit 144 into the VGGNet to extract features. The frame merging unit 150 determines which inpainted frame is inpainted better by comparing the values of the extracted features. For example, if the total sum of energy or total sum of features extracted from the inpainted frame outputted by the inter inpainting unit 142 is greater than the total sum of features extracted from the inpainted frame outputted by the intra inpainting unit 144, the inpainted frame outputted by the inter inpainting unit 142 is used as the final output frame.

The frame merging unit 150, according to another embodiment of the present disclosure, may train a neural network to synthesize two inpainted frames or select one inpainted frame among the two inpainted frames. Specifically, the frame merging unit 150 may train a merge network to select a better inpainted frame among the inpainted frame outputted by the inter inpainting unit 142 and the inpainted frame outputted by the intra inpainting unit 144.

FIG. 14 is a diagram illustrating merge network training according to at least one embodiment of the present disclosure.

As shown in FIG. 14, a merge network 1400 is an artificial neural network based on Convolutional Neural Networks (CNNs) in which two frames are inputted and one frame is outputted. According to at least one embodiment of the present disclosure, a training unit 1410 calculates the loss between the frame outputted by the merging network and the original frame or ground truth (GT) frame and trains the merging network 1400 toward reducing the loss. In other words, the training unit 1410 trains the merging network 1400 to output a frame that is similar to the original frame or GT frame.

According to at least one embodiment of the present disclosure, the training unit 1410 may calculate the difference between the frame outputted by the merging network and the GT frame or the original frame before subtitles are edited, as a loss. Specifically, the training unit 1410 may use methods such as Mean Absolute Difference (MAD), Mean Square Difference (MSD), or the like to calculate the loss, or it may use a pre-trained network to calculate the sum of the features extracted or difference in energy as the loss.

Although FIG. 6A and FIG. 6B present the respective steps thereof as being sequentially performed, they merely instantiate the technical idea of some embodiments of the present disclosure. Therefore, a person having ordinary skill in the pertinent art could incorporate various modifications, additions, and substitutions in practicing the present disclosure without departing from the very nature of some embodiments by changing the sequence of steps illustrated by FIG. 6A and FIG. 6B or by performing one or more of the steps thereof in parallel, and hence the steps in FIG. 6A and FIG. 6B are not limited to the illustrated chronological sequences.

Various implementations of the systems and methods described herein may be realized by digital electronic circuitry, integrated circuits, field-programmable gate arrays (FPGAs), application-specific integrated circuits (ASICs), computer hardware, firmware, software, and/or their combination. These various implementations can include those realized in one or more computer programs executable on a programmable system. The programmable system includes at least one programmable processor coupled to receive and transmit data and instructions from and to a storage system, at least one input device, and at least one output device, wherein the programmable processor may be a special-purpose processor or a general-purpose processor. Computer programs, which are also known as programs, software, software applications, or codes, contain instructions for a programmable processor and are stored in a "computer-readable recording medium."

The computer-readable recording medium includes any types of recording device on which data that can be read by a computer system are recordable. Examples of computer-readable recording medium include non-volatile or non-transitory media such as a ROM, CD-ROM, magnetic tape, floppy disk, memory card, hard disk, optical/magnetic disk, storage devices, and the like. The computer-readable recording medium further includes transitory media such as data transmission medium. Further, the computer-readable recording medium can be distributed in computer systems connected via a network, wherein the computer-readable codes can be stored and executed in a distributed mode.

Various implementations of the systems and techniques described herein can be realized by a programmable computer. Here, the computer includes a programmable processor, a data storage system (including volatile memory, nonvolatile memory, or any other type of storage system or a combination thereof), and at least one communication interface. For example, the programmable computer may be one of a server, network equipment, a set-top box, an embedded device, a computer expansion module, a personal computer, a laptop, a personal data assistant (PDA), a cloud computing system, or a mobile device.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the embodiments of the present disclosure is not limited by the illustrations. Accordingly, one of ordinary skill would understand the scope of the claimed invention is not to be limited by the above explicitly described embodiments but by the claims and equivalents thereof.

What is claimed is:

1. A method of inpainting an image area obscured by an object included in an image, the method comprising:
    selecting one or more frames among input frames of the image, wherein each of the one or more frames is selected as a target frame including an inpainting area obscured by the object or as a reference frame including information on the inpainting area, wherein the selected one or more frames include at least one frame selected as the target frame;
    selecting, based on whether there is a frame selected as the reference frame, one of inter inpainting, intra inpainting, and a combination thereof; and
    performing the selected inpainting on the at least one frame selected as the target frame,
    wherein the performing comprises:
    performing the intra inpainting, when no frame is selected as the reference frame, on some of frames selected as the target frame to generate one or more inpainted frames; and
    performing the inter inpainting on rest of the frames selected as the target frame by using the one or more inpainted frames as the reference frame.

2. The method of claim 1, wherein the selecting comprises:
    selecting a first frame as the target frame;
    calculating a similarity between the first frame and a second frame adjacent to the first frame by using neighboring pixels of an area that is in the first frame and in which the object is detected;
    selecting the second frame as the reference frame when the similarity is higher than a predetermined threshold similarity; and generating information about a similar area having the similarity that is highest within the second frame, and
    wherein the inpainting comprises:
    inpainting the first frame by using the first frame, the second frame, and the information about the similar area.

3. The method of claim 2, wherein the generating of the information about the similar area comprises:
    dividing the similar area into at least one divided area according to a position of the object in the second frame; and
    assigning different weights to each divided area.

4. The method of claim 1, wherein the selecting comprises:
    a first selection process comprising:
        selecting at least one first frame not including the object as a backward reference frame, and at least one second frame including the object as the target frame by checking at least some of the input frames in temporal order; and
    a second selection process comprising:
        selecting at least one third frame not including the object as a forward reference frame by checking, in temporal order, one or more next frames located temporally after the second frame.

5. The method of claim 1, wherein the selecting comprises:
    selecting, as the reference frame, one or more already processed frames on which inpainting is completed and having an inpainting area that does not overlap with the inpainting area in the target frame.

6. The method of claim 1, wherein the selecting comprises:
    selecting the one or more frames from among the input frames within a same scene based on scene transition information extracted from the image.

7. The method of claim 1, wherein the performing comprises:
    performing at least one of the inter inpainting or intra inpainting when a sum of a number of frames selected as the target frame and the number of frames selected as the reference frame exceeds a preset unit of frame processing.

8. The method of claim 1, wherein the performing comprises:
    performing the intra inpainting when no frame is selected as the reference frame, and performing the inter inpainting when there is a frame selected as the reference frame.

9. The method of claim 1, wherein the performing comprises:
    generating a query feature matrix from a first frame selected as the target frame;
    generating a key feature matrix from a second frames selected as the reference frame;
    calculating a similarity between the query feature matrix and the key feature matrix; and
    generating an inpainted frame based on the similarity.

10. The method of claim 9, wherein the query feature matrix and the key feature matrix are each a three-dimensional matrix, and
    wherein the query feature matrix is generated from the inpainting area or a neighbor area of the inpainting area.

11. The method of claim 9, wherein the calculating of the similarity comprises:

calculating similarities between areas within the first frame and the second frame.

12. The method of claim 9, wherein the calculating of the similarity comprises:

calculating a similarity matrix by using the query feature matrix and the key feature matrix, wherein each component of the similarity matrix represents a similarity between the query feature matrix and a matrix comprising at least some of the key feature matrix.

13. The method of claim 9, wherein the generating of the key feature matrix comprises:

performing feature indexing based on an amount of movement between the first frame and the second frame.

14. The method of claim 13, wherein the performing of the feature indexing comprises:

estimating the amount of movement between the first frame and the second frame; and determining, in the second frame, a valid area subject to feature indexing, wherein the valid area includes an area that is equivalent in size and position with the inpainting area of the first frame, and wherein a size of the valid area is determined based on the amount of movement.

15. The method of claim 14 wherein the estimating the amount of movement comprises:

estimating the amount of movement based on a temporal distance between the first frame and the second frame.

16. The method of claim 14, wherein the estimating the amount of movement comprises:

estimating the amount of movement based on amounts of motion of pixels in an area adjacent to the inpainting area.

17. The method of claim 9, wherein the generating of the inpainted frame comprises:

generating the inpainted frame by using a decoder network provided with an upsampling network layer at an output end, wherein the decoder network is configured to output an inpainted frame with a resolution equal to an original resolution of the first frame.

18. A non-transitory computer-readable recording medium for executing each of the steps comprised in the method of inpainting an image area according to claim 1.

19. An apparatus for inpainting an image area obscured by an object included in an image, comprising:

a frame selection unit configured to select one or more frames among input frames of the image, wherein each of the one or more frames is selected as a target frame including an inpainting area obscured by the object or as a reference frame including information on the inpainting area, wherein the selected one or more frames include at least one frame selected as the target frame; and an inpainting unit configured to select, based on whether there is a frame selected as the reference frame, one of inter inpainting, intra inpainting, and a combination thereof, and to perform the selected inpainting on the at least one frame selected as the target frame, wherein the inpainting unit is configured to:

perform the intra inpainting, when no frame is selected as the reference frame, on some of frames selected as the target frame to generate one or more inpainted frames; and perform the inter inpainting on rest of the frames selected as the target frame by using the one or more inpainted frames as the reference frame.

\* \* \* \* \*